C. T. HENDERSON.
AUTOMATIC SLOW DOWN CONTROLLER.
APPLICATION FILED APR. 20, 1914.

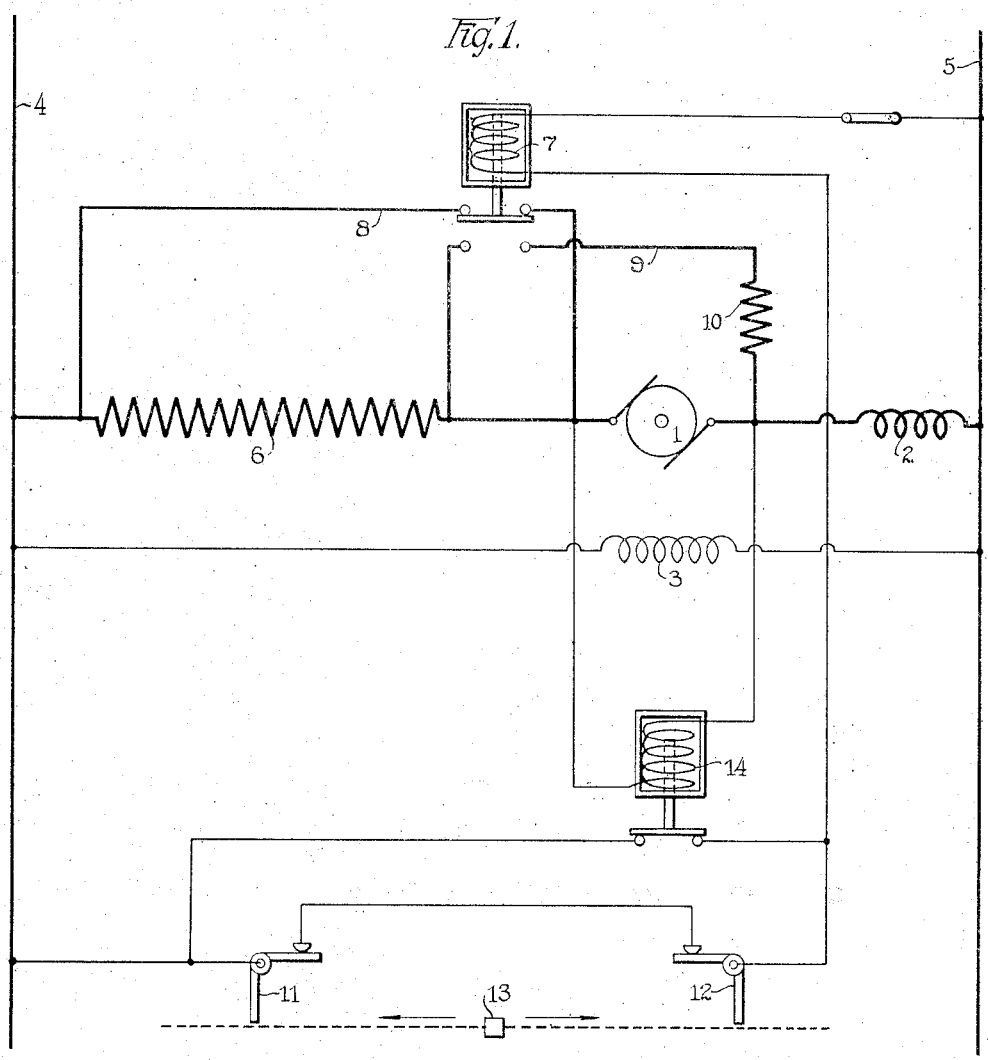

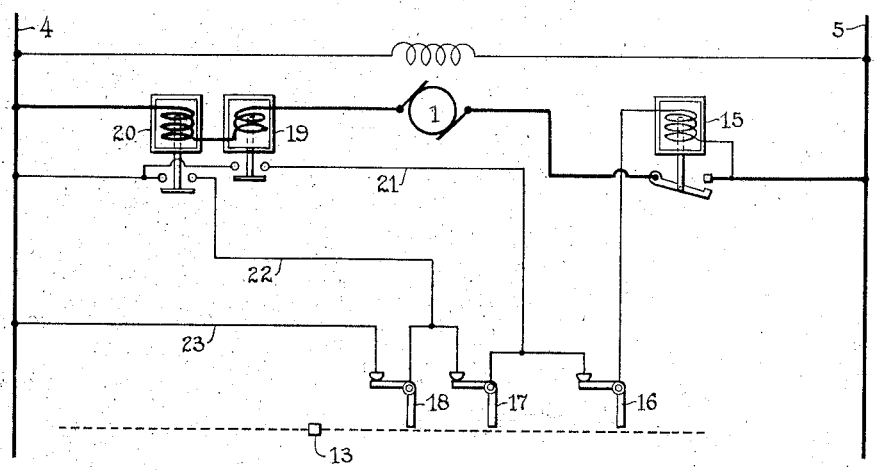
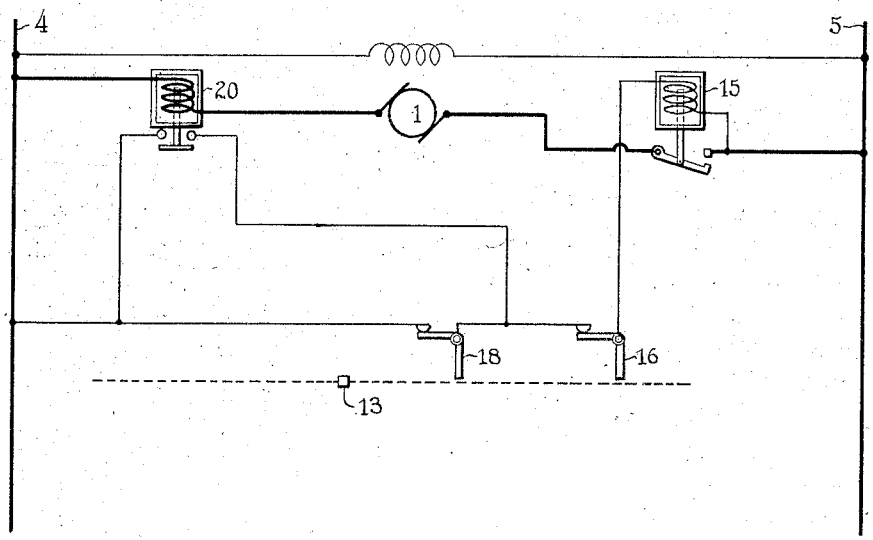

1,282,828.

Patented Oct. 29, 1918.

Witnesses:

Inventor:
Clark T. Henderson

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

AUTOMATIC SLOW-DOWN CONTROLLER.

1,282,828.   Specification of Letters Patent.   Patented Oct. 29, 1918.

Application filed April 20, 1914. Serial No. 833,230.

*To all whom it may concern:*

Be it known that I, CLARK T. HENDERSON, a citizen of the United States, residing at Milwaukee, in the county of Milwaukee and State of Wisconsin, have invented new and useful Improvements in Automatic Slow-Down Controllers, of which the following is a full, clear, concise, and exact description, reference being had to the accompanying drawings, forming a part of this specification.

This invention relates to automatic slow-down controllers and limit stops for motors.

There are many classes of machinery operated by electric motors in which it is desirable to stop the motor at a predetermined point in the operation of the machine regardless of the speed at which the motor is operating.

The present invention relates to controllers for motors of this type.

An object of the present invention is to provide an improved controller for variable speed motors which will automatically come into action at a point in the operation of the motor dependent upon the motor speed to slow down and stop the motor at a predetermined point in its operation.

Another object of the invention is to provide means for preventing the operation of the slow-down devices when the motor speed is low.

Preferred embodiments of the invention are illustrated in the accompanying drawing, in which—

Figure 1 illustrates diagrammatically a simple form of slow down controller.

Fig. 2 illustrates a slow down controller and limit stop for motors which are subject to considerable variations in speed.

Fig. 3 illustrates a further modification.

Figure 4:
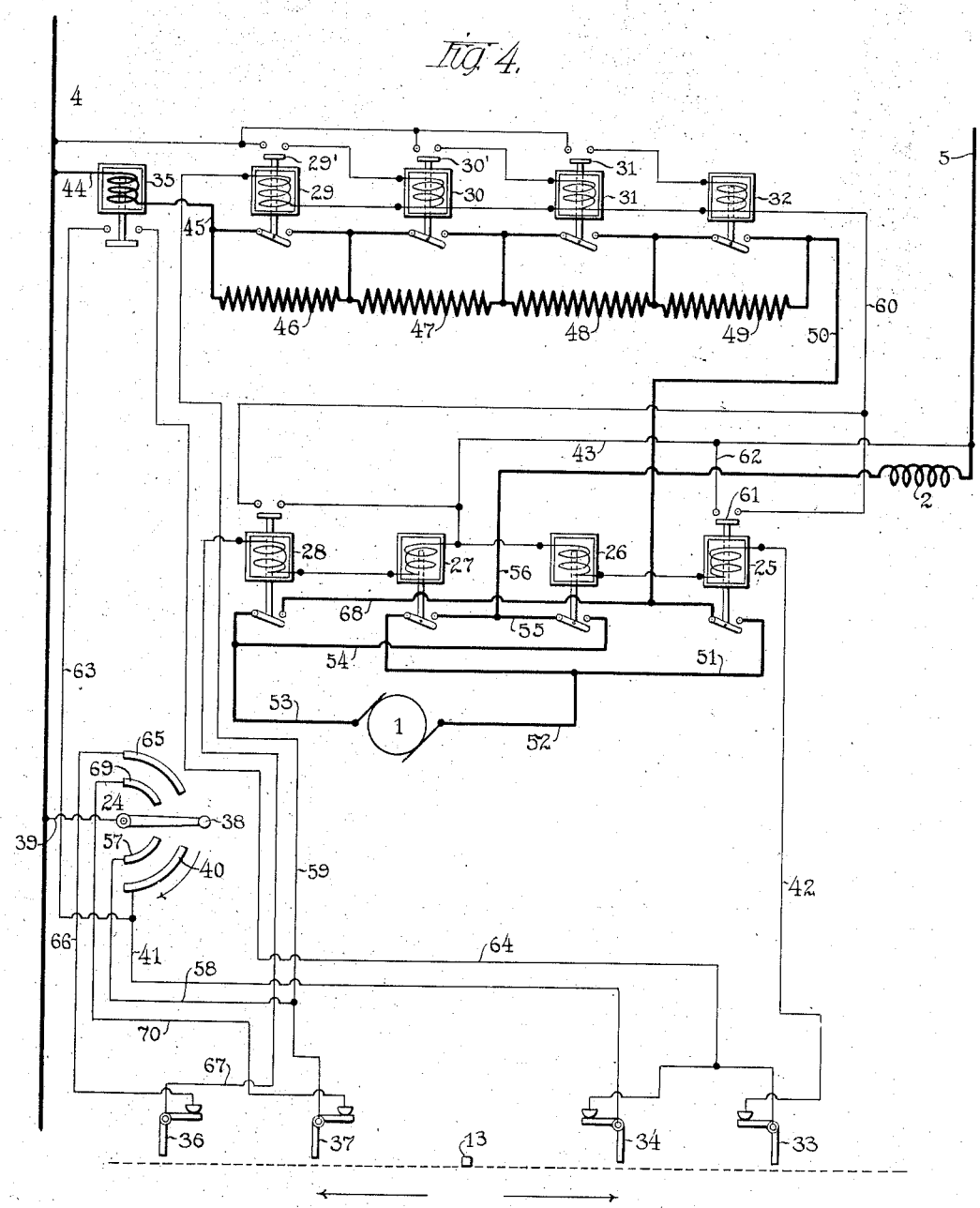
Fig. 4 illustrates a still further modification applied to the control circuits of a reversible motor.

Fig. 1 illustrates a motor provided with an armature 1, a series field 2 and a shunt field 3, connected across the supply mains 4 and 5. Any other type of motor shunt, series, or compound wound may be employed. A starting resistance 6 is connected in series with the armature and may be controlled by any well-known form of motor starter. A relay 7 is adapted, when energized to close a short circuit 8 around the starting resistance and when deënergized to close a short circuit 9, including a resistance 10, around the motor armature. The circuit for the coil of the relay 7 is completed through auxiliary switches 11 and 12, arranged toward the limits of travel of the elevator or other device diagrammatically represented at 13. These auxiliary switches are arranged in advance of the usual limit switches, not shown. A parallel circuit for the coil of the relay 7 is provided around the auxiliary switches. This circuit is controlled by a second relay 14, the operating coil of which is connected across the motor armature. This relay being connected in shunt to the motor armature will lift its contact when the motor speed is high and the motor is consequently developing a high C. E. M. F.

The operation of the controller is substantially as follows: While the motor is in operation the relay 7 will hold its contact member raised, to short circuit the resistance 6. Should the motor speed become sufficiently high the relay 14 will lift its contact, thus leaving the only circuit for the relay 7 dependent upon the auxiliary limit switches 11 and 12. As the elevator, or other device 13 approaches the limit of its travel in either direction, it will open one or the other of the auxiliary switches and thereby deënergize the relay 7. This will cause the relay 7 to open the short circuit 8, thereby reintroducing the resistance 6 in series with the armature and at the same time closing the short circuit 9 around the motor armature. This will sufficiently slow down the motor so that upon operation of the customary limit switch the motor will not over run.

If the motor speed is low when the elevator or other device approaches its limit of travel, the relay 14 will maintain the parallel circuit around the auxiliary switches 11 and 12 so that the main relay 7 will be unaffected by the opening of the auxiliary switches. Under these conditions the motor will be stopped by the main limit switch in the customary manner.

Fig. 2 illustrates a slow-down controller and limit stop in which the motor speed may vary over a considerable range. The motor armature 1 is connected across the mains 4 and 5 through a main motor switch 15. The circuit for the coil of the motor switch 15 is completed through the contacts of a limit switch 16 and auxiliary limit switches 17 and 18 in series. Relays 19 and 20 control parallel circuits around the auxiliary limit switches 17 and 18 respectively. The operating coils for the relays 19 and 20 are preferably arranged in series with the motor armature and are designed to draw up their contacts to close the parallel circuits, upon closure of the motor circuit. These coils are of different holding power so that as the motor speed increases the consequent decrease in current through the motor armature circuit will cause the relays to drop out successively.

If the motor speed is low both relays will maintain their respective circuits closed around the auxiliary switches 17 and 18, so that actuation of these switches by the elevator 13 will not deënergize the main switch 15. Under these conditions the circuit for the coil of the switch 15 will be from main 4 through conductors 21, 22 and 23 in parallel so that both circuits, 21 and 22, may be broken at switches 17 and 18 without affecting the switch. Actuation of the main limit switch 16 will, however, open the switch coil circuit and stop the motor.

Should the motor speed have increased sufficiently the armature current will be sufficiently reduced, due to the increased C. E. M. F., to cause relay 19 to drop out. Auxiliary switch 18 will still be short circuited by relay 20, but auxiliary switch 17 will be effective to open the main switch circuit when the elevator reaches a point somewhat in advance of the limit switch 16.

Should the motor have attained a maximum speed, the relay 20 will also have dropped its contact so that the only circuit for the main switch will be through conductor 23 and the three limit switches in series. Actuation of the first switch 18 will, therefore, open the main switch circuit when the elevator is still further in advance of the limit switch 16.

Fig. 3 illustrates an arrangement similar to Fig. 2, in which a single auxiliary limit switch and its corresponding relay are employed. The operation will be apparent from the description of Fig. 2.

It is obvious that in both Figs. 2 and 3, additional limit and auxiliary limit switches may be provided for the opposite limit of travel of the elevator or other device. It is to be understood that the arrangement suggested in Fig. 1 may be employed, if desired, and the relays arranged in shunt to the motor armature so as to open the parallel circuits around the auxiliary switches as the motor C. E. M. F. increases.

Fig. 4 illustrates a reversible motor provided with an armature 1 and a series field 2. A master controller 24 controls the starting and direction of rotation of the motor through forward motor switches 25 and 26 and reverse switches 27 and 28 and controls the motor speed through accelerating switches 29, 30, 31 and 32. The circuits for the forward motor switches are completed through the forward limit switch 33 and the auxiliary limit switch 34 in series. A main relay 35, having an operating coil in series with the motor armature, is adapted to short circuit the contacts of the auxiliary limit switch 34 when the motor speed is low; but is adapted to drop out when the motor speed is high, thereby, rendering the auxiliary switch 34 operative to control the motor switch circuits.

A reverse limit switch 36 and auxiliary switch 37 provide for slowing down and stopping the motor when operating in the reverse direction. The reverse limit switch controls the circuit for the main reverse motor switches and the auxiliary switch serves to slow down the motor by dropping out the accelerating switch as hereinafter explained.

The operation of this modification is as follows: With the master controller in "off" position as illustrated, the motor switches and auxiliary switches will be open and the mechanical limit switches closed. Upon movement of the controller arm 38 to the forward position, indicated by the arrow, a circuit will be completed from the main 4 through conductor 39, contact arm 38, segment 40, conductor 41, auxiliary limit switch 34, limit switch 33, conductor 42, the coils of forward motor switches 25 and 26 and conductor 43 to main 5.

This will close the switches 25 and 26, thereby establishing a motor circuit from main 4 through conductor 44, operating coil of relay 35, conductor 45, resistance sections 46, 47, 48 and 49, conductor 50, the contacts of switch 25, conductors 51 and 52, motor armature 1, conductors 53 and 54, the contacts of switch 26, conductors 55 and 56 and motor field 2 to the main 5. A circuit will also be established for the accelerating switches from controller arm 38 through segment 57, conductors 58 and 59, the coil of accelerating switch 29, conductor 60, an auxiliary contact 61 on switch 25 and conductors 62 and 43 to the main 5. The accelerating switches will cut in in succession in the usual manner, each one, in closing, completing a circuit for the next through an auxiliary contact 29', 30' or 31'. As long as the motor speed is low the contacts of relay 35 will be closed, thus, completing a parallel circuit around the auxiliary limit switch from conductor 41 through conductor 63, the contacts of relay 35 and conductor 64 to the conductor connecting the auxiliary switch 34 and the limit switch 33. As long, therefore, as the motor speed is low the elevator 13 may open the auxiliary switch 34 without affecting the motor circuits; but upon opening the limit switch 33 the forward motor switches 25 and 26 will be opened. Should the motor speed be sufficiently high the decreased motor current will cause the relay 35 to open, whereupon the auxiliary switch 34 will control the circuit for the main switches 25 and 26 and will cause these switches to open before the elevator reaches the main limit switch.

The movement of the controller arm in the reverse direction will energize the reverse motor switches 27 and 28 by a circuit from main 4 through conductor 39, controller arm 38, segment 65, conductor 66, reverse limit switch 36, conductor 67, the operating coils of switches 28 and 27 in series and conductor 43 to the main 5. This will cause the reverse motor switches to complete the motor circuit through conductors 44 and 45, resistance sections 46 to 49, conductors 50 and 68, the contacts of switch 28, conductor 53, motor armature 1, conductors 52 and 51, the contacts of switch 27, conductors 55 and 56 and motor field 2 to the main 5. A circuit for the accelerating switches will also be completed from controller arm 38 through segment 69, conductor 70, auxiliary limit switch 37 to conductor 59, and through the accelerating switches as before. As the elevator approaches the reverse limit of its travel the auxiliary limit switch 37 will be opened. This will immediately drop out the accelerating switches, thus inserting the full resistance in series with the motor, causing a rapid deceleration. Further movement of the elevator or other device will open the limit switch 36, dropping out the reverse motor switches 27 and 28, thus stopping the motor.

What I claim as my invention and desire to secure by Letters Patent of the United States is:—

1. In combination, an electric motor, electro-responsive control means therefor, a plurality of limit switches controlling said electro-responsive means, said limit switches being connected in series and operable progressively, and means for automatically shunting certain of said limit switches under predetermined speed conditions of the motor.

2. In combination, an electric motor, electro-responsive control means therefor, a plurality of limit switches controlling said electro-responsive means, said limit switches being connected in series and operable progressively and a plurality of electro-responsive devices, each controlling a shunt around a different one of said limit switches, said devices acting under different predetermined speed conditions of the motor to shunt their respective limit switches.

3. In combination, an electric motor, electro-responsive control means therefor, a plurality of progressively operable limit switches connected in series for controlling said means and an electro-responsive relay responsive to render one of said limit switches ineffective, said relay having its operating winding connected in series with said motor.

4. In combination, an electric motor, electro-responsive control means therefor, a plurality of progressively operable limit switches controlling said means and a plurality of electro-responsive relays each operable to render a different one of said limit switches ineffective, said relays being subject to the influence of varying electrical conditions of said motor and being adjusted to act under different predetermined electrical conditions.

5. In combination, an electric motor, electro-responsive control means therefor, a plurality of progressively operable limit switches controlling said means and a plurality of electro-responsive relays each operable to render a different one of said limit switches ineffective, said relays being adjusted for operation under different predetermined electrical conditions and having their operating windings connected in series with said motor.

6. In combination, an electric motor, electro-responsive reversing switches therefor, electro-responsive accelerating means, a plurality of progressively operable limit switches for controlling energization of one of said reversing switches and said accelerating means, a plurality of progressively operable limit switches connected in series for controlling energization of the other of said reversing switches and a relay for short circuiting certain of said limit switches under predetermined speed conditions of said motor.

In witness whereof, I have hereunto subscribed my name in the presence of two witnesses.

CLARK T. HENDERSON.

Witnesses:
F. E. SAYMAN,
L. A. WATSON.